(12) United States Patent
Yi et al.

(10) Patent No.: US 11,811,580 B2
(45) Date of Patent: Nov. 7, 2023

(54) ENCODING METHOD, DECODING METHOD, AND APPARATUS

(71) Applicant: Huawei Technologies Co., Ltd., Shenzhen (CN)

(72) Inventors: Hong Yi, Beijing (CN); Juan Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/810,366

(22) Filed: Jul. 1, 2022

(65) Prior Publication Data
US 2022/0345352 A1 Oct. 27, 2022

Related U.S. Application Data

(63) Continuation of application No. PCT/CN2020/116678, filed on Sep. 22, 2020.

(30) Foreign Application Priority Data
Jan. 2, 2020 (CN) .......................... 202010001718.8

(51) Int. Cl.
*H04L 27/00* (2006.01)
*H04L 27/34* (2006.01)
*H04L 1/00* (2006.01)

(52) U.S. Cl.
CPC ........ *H04L 27/3416* (2013.01); *H04L 1/0061* (2013.01)

(58) Field of Classification Search
CPC . H04L 27/3416; H04L 1/0061; H04L 1/0042; H04L 27/3405; H04L 1/004

(Continued)

(56) References Cited

U.S. PATENT DOCUMENTS

| | | | | |
|---|---|---|---|---|
| 2018/0091225 A1* | 3/2018 | Wang | .................. | H04B 10/612 |
| 2019/0342031 A1* | 11/2019 | Böcherer | .............. | H04L 1/0045 |
| 2020/0091608 A1* | 3/2020 | Alpman | ............... | H04B 7/0639 |

FOREIGN PATENT DOCUMENTS

| | | |
|---|---|---|
| CN | 101662304 A | 3/2010 |
| CN | 104429033 A | 3/2015 |

(Continued)

OTHER PUBLICATIONS

Zhang, H. et al., "Multi Dimensional Coded Modulation in Long-Haul Fiber Optic Transmission", Journal of Lightwave Technology, vol. 33, No. 13, Jul. 1, 2015, 8 pages.

(Continued)

*Primary Examiner* — Tanmay K Shah
(74) *Attorney, Agent, or Firm* — Slater Matsil, LLP

(57) ABSTRACT

This application provides an encoding method. The encoding method includes: first, splitting obtained to-be-encoded data into phase data and amplitude data according to a preset rule; then, obtaining a constellation diagram corresponding to the to-be-encoded data, where the constellation diagram includes a plurality of constellation points, the plurality of constellation points include a constellation point with an amplitude value of 0, each constellation point has a corresponding probability value, and the probability value indicates an occurrence probability of the corresponding constellation point; then, performing probabilistic constellation shaping encoding on the amplitude data based on the constellation diagram and the probability value corresponding to each constellation point, to obtain at least one group of symbol sequences; and then combining the at least one group of symbol sequences and the phase data, and then performing encoding, to obtain output data.

20 Claims, 10 Drawing Sheets

(58) Field of Classification Search
USPC .......................................................... 375/268
See application file for complete search history.

(56) References Cited

FOREIGN PATENT DOCUMENTS

| | | |
|---|---|---|
| CN | 105164927 A | 12/2015 |
| CN | 108574650 A | 9/2018 |
| CN | 108809375 A | 11/2018 |
| CN | 109104250 A | 12/2018 |
| CN | 109217933 A | 1/2019 |
| CN | 109756438 A | 5/2019 |
| CN | 110213193 A | 9/2019 |
| CN | 110535802 A | 12/2019 |
| JP | 2020535741 A | 12/2020 |
| JP | 2021527792 A | 10/2021 |

OTHER PUBLICATIONS

International Telecommunication Union, Telecommunication Standardization Sector, "Draft text for G. mgfast-PHY", Source-Editor G.mgfast, Q4/15-TD45-R1 (190401)-RO5, Study Group 15, Geneva, Switzerland, Apr. 1-5, 2019, 155 pages.

* cited by examiner

ENCODING METHOD, DECODING METHOD, AND APPARATUS

CROSS-REFERENCE TO RELATED APPLICATIONS

This application is a continuation of International Application No. PCT/CN2020/116678, filed on Sep. 22, 2020, which claims priority to Chinese Patent Application No. 202010001718.8, filed on Jan. 2, 2020. The disclosures of the aforementioned applications are hereby incorporated by reference in their entireties.

TECHNICAL FIELD

This application relates to the communication field, and in particular, to an encoding method, a decoding method, and an apparatus.

BACKGROUND

In data transmission, a transmit device usually needs to encode data and send encoded data to a receive device.

In a communication system, bit information may be classified into two types: amplitude bits and phase bits. Probabilities of the amplitude bits are adjusted by using, for example, a probabilistic constellation shaping (PCS) algorithm, to output a sequence including redundant bits. Then, the sequence carrying redundant bits and the phase bits are combined and then input into a forward error correction (FEC) encoder for encoding, to obtain systematic code including information bits and check bits. Bit streams obtained after encoding are mapped to a pulse amplitude modulation (PAM) signal based on phase bits and amplitude bits, or are mapped based on in-phase PAM and quadrature PAM and then combined into a quadrature amplitude modulation (QAM) signal. That is, the PAM signal or the QAM signal is shaped by using the PCS algorithm.

However, in an existing solution, information entropy included in each symbol obtained after mapping is fixed, and due to existence of the symbol, at least one bit is needed to identify the symbol. Therefore, the included information entropy needs to be greater than or equal to 1. However, in data transmission, when transmitted data includes larger information entropy, a higher signal-to-noise ratio (SNR) is required. Therefore, a harsher transmission condition requires smaller information entropy included in data, especially in long-distance transmission, for example, in a submarine cable transmission scenario, in which smaller information entropy is usually required. Accordingly, how to carry information entropy more flexibly in data transmission becomes an urgent problem to be resolved.

SUMMARY

This application provides an encoding method, a decoding method, and apparatuses, to implement more flexible information entropy in data transmission, especially to implement smaller information entropy to improve stability of long-distance data transmission.

According to a first aspect, this application provides an encoding method, including: first, splitting obtained to-be-encoded data into phase data and amplitude data according to a preset rule; then, obtaining a constellation diagram corresponding to the to-be-encoded data, where the constellation diagram includes a plurality of constellation points, the plurality of constellation points include a constellation point with an amplitude value of 0, each constellation point has a corresponding probability value, and the probability value indicates an occurrence probability of the corresponding constellation point; then, performing probabilistic constellation shaping encoding on the amplitude data based on the constellation diagram and the probability value corresponding to each constellation point, to obtain at least one group of symbol sequences; and then combining the at least one group of symbol sequences and the phase data, and then performing encoding, to obtain output data.

According to a second aspect, this application provides a decoding method, including: first, obtaining a received signal; then, performing hard decision on the received signal, to obtain first amplitude data; then, performing iterative decoding based on the received signal and the first amplitude data, to obtain second amplitude data and phase data, where N is a positive integer; performing probabilistic constellation shaping decoding on the second amplitude data based on a preset constellation diagram, to obtain amplitude-decoded data, where the constellation diagram includes a plurality of constellation points, the constellation diagram includes a constellation point with an amplitude value of 0, each constellation point has a corresponding probability value, and the probability value indicates an occurrence probability of the corresponding constellation point; and then, combining the amplitude-decoded data and the phase data, to obtain decoded data.

According to a third aspect, an embodiment of this application provides an encoding device, including a processor and a memory. The processor and the memory are interconnected through a line, and the processor invokes program code in the memory to perform a processing-related function in the encoding method in any one of the first aspect and the implementations thereof.

According to a fourth aspect, an embodiment of this application provides a decoding device, including a processor and a memory. The processor and the memory are interconnected through a line, and the processor invokes program code in the memory to perform a processing-related function in the decoding method in any one of the first aspect and the implementations thereof.

According to a fifth aspect, an embodiment of this application provides a digital processing chip. The chip includes a processor and a memory. The memory and the processor are interconnected by using a line, the memory stores instructions, and the processor is configured to perform a processing-related function in the method in any one of the first aspect and the second aspect and the implementations thereof.

According to a sixth aspect, an embodiment of this application provides a communication system. The communication system includes an encoding device and a decoding device. The encoding device is described in the third aspect, and the decoding device is described in the fourth aspect.

According to a seventh aspect, an embodiment of this application provides a computer-readable storage medium, including instructions. When the instructions are run on a computer, the computer is enabled to perform the method in any one of the first aspect and the second aspect and the implementations thereof.

According to an eighth aspect, an embodiment of this application provides a computer program product including instructions. When the computer program product runs on a computer, the computer is enabled to perform the method in any one of the first aspect and the second aspect and the implementations thereof.

DETAILED DESCRIPTION OF ILLUSTRATIVE EMBODIMENTS

The following clearly describes the technical solutions in embodiments of this application with reference to the accompanying drawings in the embodiments of this application. It is clear that the described embodiments are merely some but not all of the embodiments of the present invention. All other embodiments obtained by a person skilled in the art based on the embodiments of the present invention without creative efforts shall fall within the protection scope of the present invention.

Figure 1A:
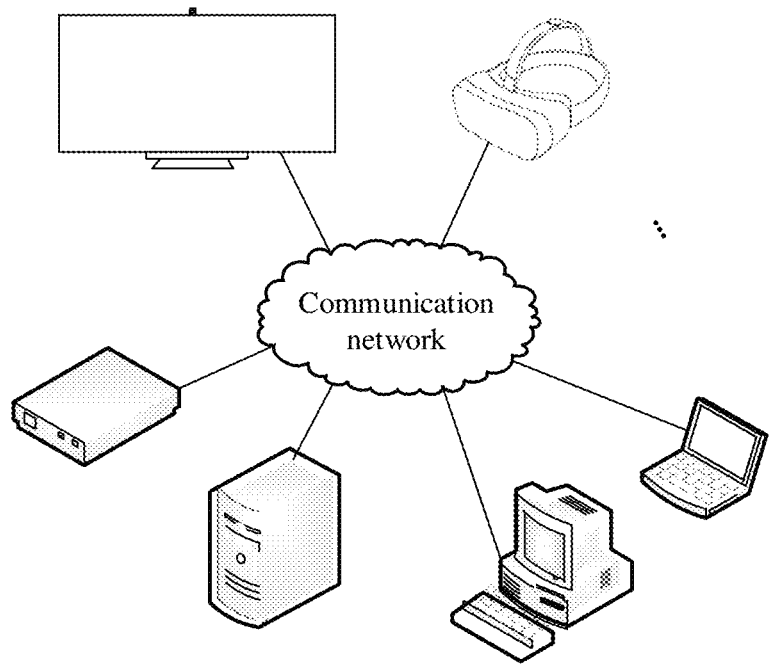
FIG. 1A is a schematic diagram of a communication system according to this application.

First, a communication system provided in this application is described with reference to FIG. 1A. An encoding method and a decoding method provided in this application may be applied to the communication system. The communication system may include a plurality of devices. The plurality of devices may establish connections and transmit data through a communication network. In the following implementations in this application, a data sending device is referred to as an encoding device, and a data receiving device is referred to as a decoding device.

Specifically, the communication network may include an optical communication network, a wireless communication network, a combination of an optical communication network and a wireless communication network, or the like. The optical communication network includes but is not limited to any one or a combination of more of an optical transport network (OTN), a synchronous digital hierarchy (SDH), a passive optical network (PON), an Ethernet (Ethernet), a flexible Ethernet (FlexE), or the like. The wireless communication network includes but is not limited to any one or more of a 5th generation (5G) mobile communication technology system, a long term evolution (LTE) system, a global system for mobile communications (GSM), a code division multiple access (CDMA) network, a wideband code division multiple access (WCDMA) network, wireless fidelity (Wi-Fi), bluetooth, ZigBee, a radio frequency identification (RFID) technology, long range (Lora) wireless communication, and near field communication (NFC).

Correspondingly, the encoding device or decoding device in this application may be a device in the communication network, for example, a 5G base station, an OTN device, an ADSL device, or an optical communication device.

Figure 1B:
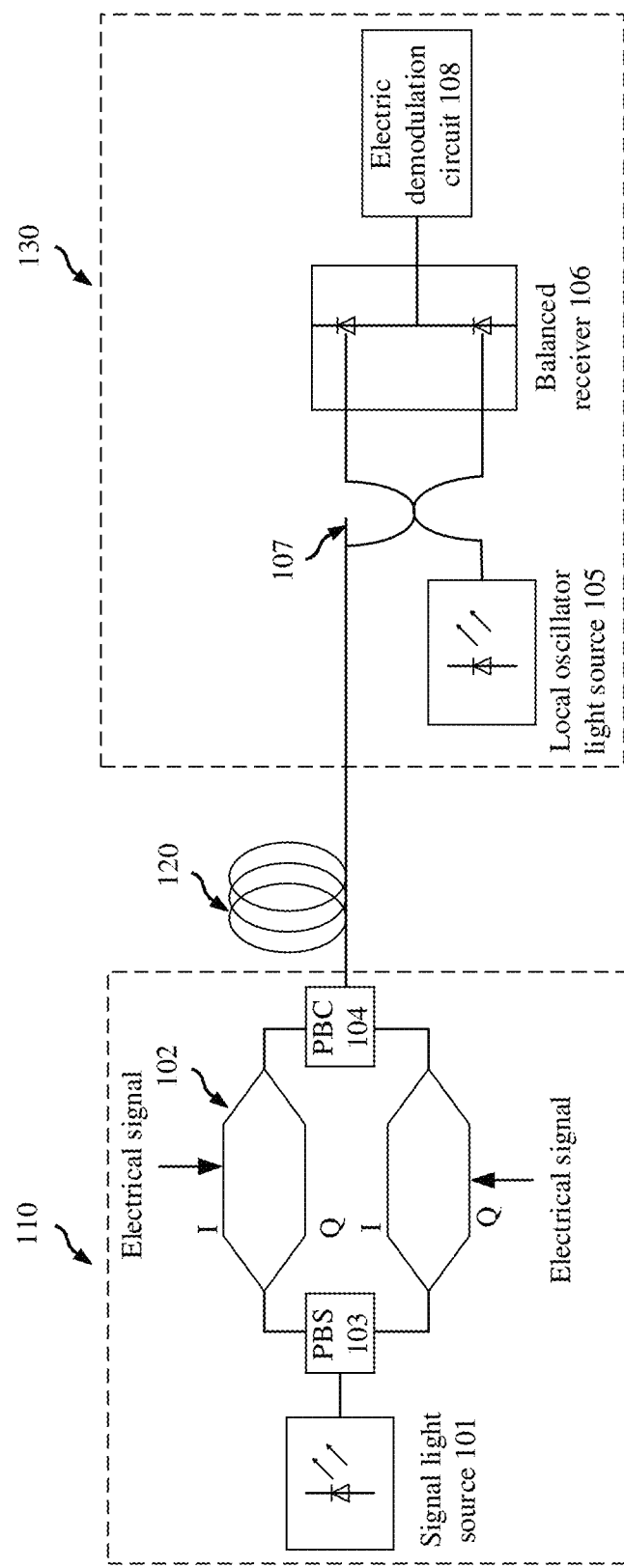
FIG. 1B is a schematic diagram of another communication system according to this application.

More specifically, the technical solutions provided in this application may be applied to a plurality of types of optical communication systems, for example, a coherent optical communication system, an incoherent communication system, a direct detection optical communication system, and another communication system that may implement the technical solutions of the present invention. With reference to FIG. 1B, the following uses a coherent optical communication system as an example for description.

FIG. 1B is a schematic structural diagram of a coherent optical communication system according to an embodiment of this application. The coherent optical communication system includes an encoding device 110, an optical fiber 120, and a decoding device 130. The encoding device no may include a signal light source 101, a modulator 102, a polarization beam splitter (PBS) 103, and a polarization beam combiner (PBC) 104. The encoding device no may further include a digital signal processor (DSP) or a digital signal processing chip, and is configured to generate an electrical signal. The decoding device 130 may include a local oscillator light source 105, a balanced receiver 106, a PBS (not shown in the figure), a frequency mixer 107, and an electric demodulation circuit 108. The electric demodulation circuit 108 may include a DSP or a digital signal processing chip. The encoding device and the decoding device may be on a same device or different devices. In this application, only two separate devices are used as an example for description, and are not used as a limitation. The technical solutions in the embodiments of this application may be applied to a coherent optical communication system that supports polarization multiplexing, or may be applied to a coherent optical communication system of another form, for example, a coherent optical communication system that uses a single state of polarization. The coherent optical communication system that uses the single state of polarization may not have a PBS or a PBC.

In the encoding device no, the signal light source 101 may be a laser. An optical signal emitted by the signal light source 101 is divided into an optical signal X and an optical signal Y by using the polarization beam splitter 103. The modulator 102 loads one electrical signal to the optical signal X, and loads the other electrical signal to the optical signal Y. The electrical signal may be obtained after the DSP at the encoding device (TxDSP) performs one or more processing such as FEC, constellation mapping, and pulse shaping, on an information bit stream. The modulator 102 may be an I/Q modulator, each electrical signal includes a signal I and a signal Q, and a phase difference between the signal I and the signal Q is 90 degrees. After the electrical signals pass through the modulator 102, four signals are formed: XI, XQ, YI, and YQ. Then, the optical signal X and the optical signal Y loaded with the electrical signals are multiplexed by using the polarization beam combiner 104. Then, a multiplexed signal is sent through the optical fiber 120.

After the decoding device 130 receives the optical signal transmitted through the optical fiber 120, the polarization beam splitter splits the received optical signal into two orthogonal signals, where frequency mixing 107 is performed between each orthogonal signal and one optical signal generated by the local oscillator light source 105. The local oscillator light source 105 may be a laser. Four optical signals XI, XQ, YI, and YQ whose polarization and phases are orthogonal are obtained after the frequency mixing is performed. Then, the balanced receiver 106 converts the optical signals into analog electrical signals, and an analog-to-digital conversion circuit converts the analog electrical signals into four digital electrical signals. The DSP at the receiving device (RxDSP) performs one or more processing such as dispersion compensation, polarization demultiplexing, equalization, and decoding on the digital electrical signals.

Further, with reference to FIG. 1B, the following describes in more detail the encoding device and the decoding device provided in this application.

Figure 2:
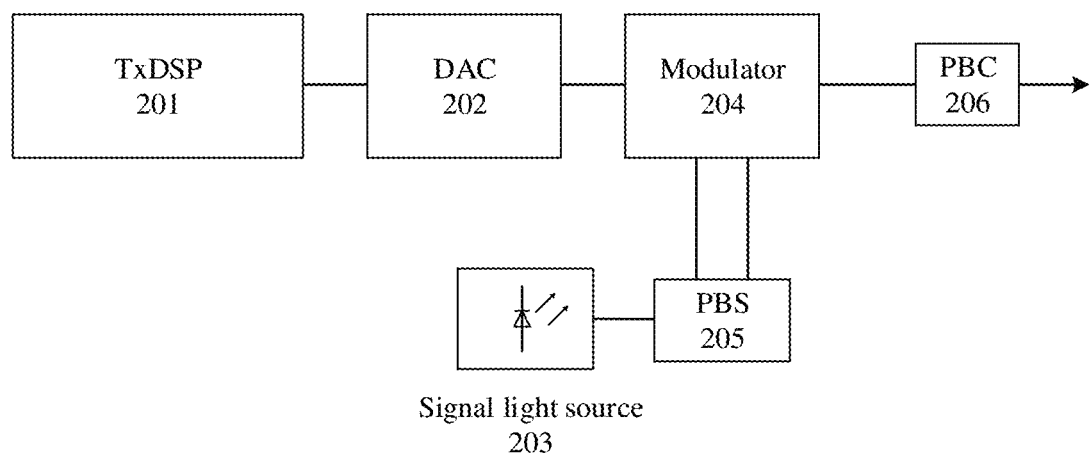
FIG. 2 is a schematic structural diagram of an encoding device according to this application.

FIG. 2 is a schematic structural diagram of an encoding device according to an embodiment of this application. The encoding device may include a DSP at a transmit end (TxDSP) 201, a digital-to-analog converter (DAC) 202, a signal light source 203, a modulator 204, a polarization beam splitter (PBS) 205, a polarization beam combiner (PBC) 206, and the like. The TxDSP 201 may include one or more functional modules such as an FEC module, a constellation mapping module, a pulse shaping module, and a spectrum shifting module. The functional modules on the TxDSP may be implemented based on hardware, or may be implemented based on software, or may be implemented in combination with hardware and software. For example, the TxDSP may be implemented by an application-specific integrated circuit (ASIC), a field programmable gate array (FPGA), or a digital logic circuit. For another example, the TxDSP may include a processor and a memory. The processor implements functions of the one or more functional modules by running program code stored in the memory. For another example, the TxDSP may have no function of storing program code, and has only a function of a processor. For a working principle of the encoding device, refer to the description of the encoding device no in the embodiment in FIG. 1B. In this application, the encoding device may be used to perform steps of an encoding method corresponding to any one of embodiments in FIG. 4 to FIG. 8 below. More specifically, the steps of the encoding method corresponding to any one of the embodiments in FIG. 4 to FIG. 8 below may be performed by the TxDSP.

It should be noted that the DAC 202, the signal light source 203, the PBS 205, or the PBC 206 is an optional module. For example, when the encoding device is a device in a wireless communication network, the DAC 202, the PBS 205, and the PBC 206 may not be included, and the signal light source 203 may be replaced with an oscillator, to complete transmission of wireless signals.

Figure 3:
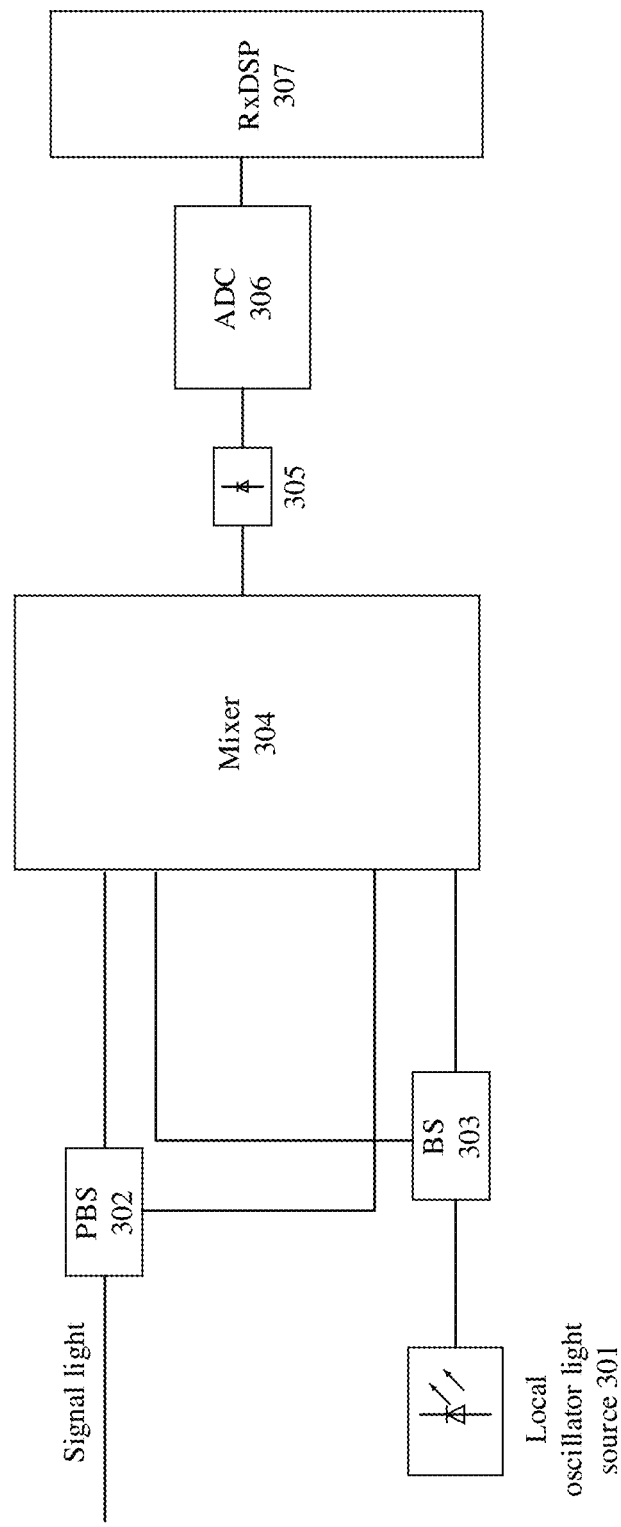
FIG. 3 is a schematic structural diagram of a decoding device according to this application.

FIG. 3 is a schematic structural diagram of a decoding device according to an embodiment of this application. The decoding device may include a local oscillator light source 301, a polarization beam splitter (PBS) 302, a beam splitter (BS) 303, a mixer 304, a balancing receiver 305, an analog-to-digital converter (ADC) 306, and a receive end DSP (RxDSP) 307. The RxDSP 707 may include one or more functional modules configured to perform dispersion compensation, equalization, polarization demultiplexing, phase recovery, and FEC. The functional modules on the RxDSP may be implemented based on hardware, or may be implemented based on software, or may be implemented in combination with hardware and software. For example, the RxDSP may be implemented by using an ASIC, an FPGA, or a digital logic circuit. For another example, the RxDSP may include a processor and a memory. The processor implements functions of the one or more functional modules by running program code stored in the memory. For another example, the RxDSP may have no function of storing program code, and has only a function of a processor. For a principle of the decoding device, refer to the description of the decoding device 130 in the embodiment in FIG. 1. In this application, the decoding device may be used to perform steps of a decoding method corresponding to FIG. 9 below. More specifically, the steps of the decoding method corresponding to FIG. 9 below may be performed by the RxDSP.

It should be noted that the ADC 306, the local oscillator light source 301, the PBS 302, the balancing receiver 305, or the BS 303 is an optional module. For example, when the decoding device is a device in a wireless communication network, the ADC 306, the balancing receiver 305, the PBS 302, and the BS 303 may not be included, and the local oscillator light source 301 is replaced with an oscillation source, to complete transmission of wireless signals.

Based on the communication system, the encoding device, and the decoding device provided in FIG. 1A to FIG. 3, the following describes the encoding method and the decoding method provided in this application.

Figure 4:
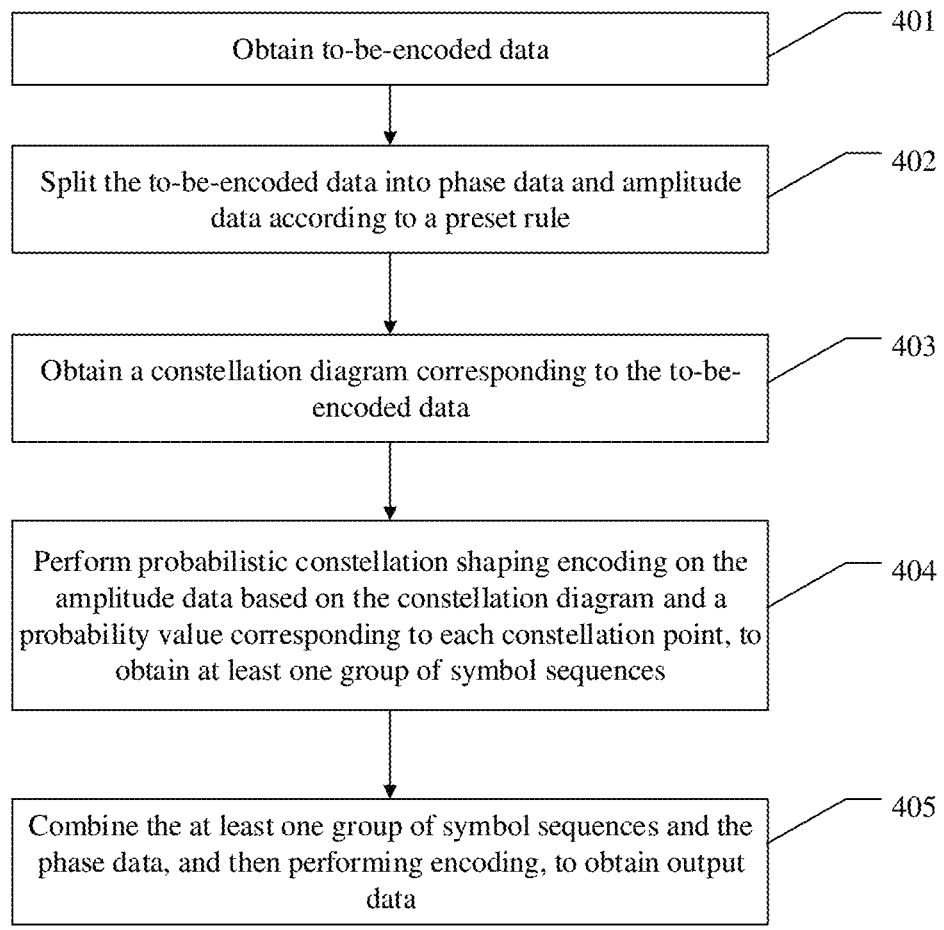
FIG. 4 is a schematic flowchart of an encoding method according to this application.
Figure 5:
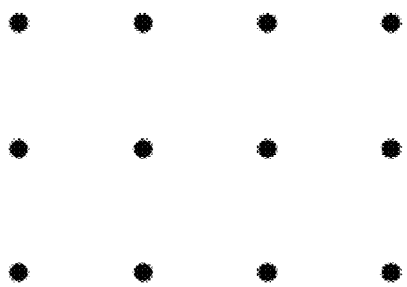
FIG. 5 is a schematic diagram of a plane of a constellation diagram determined in an encoding method according to this application.
Figure 6:
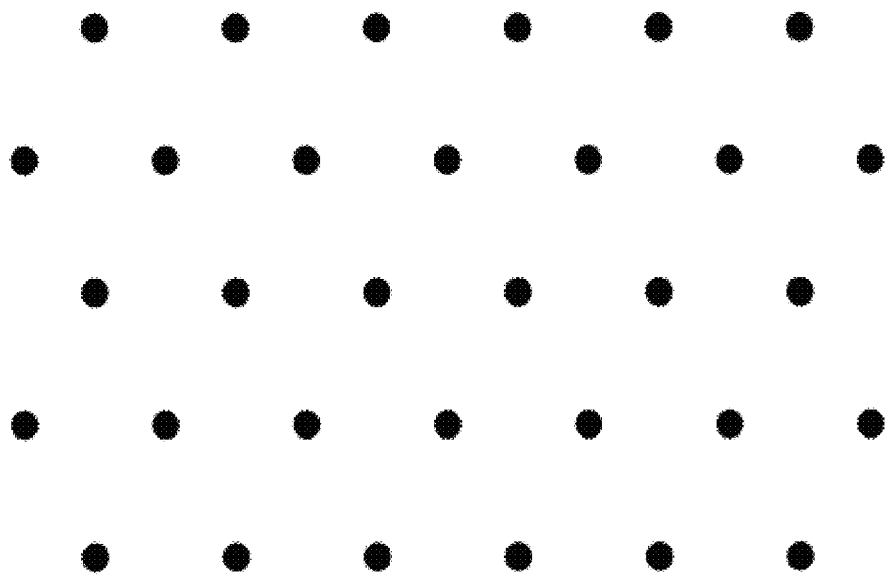
FIG. 6 is a schematic diagram of a plane of another constellation diagram determined in an encoding method according to this application.

With reference to FIG. 4, the following describes the encoding method provided in this application.

401: Obtain to-be-encoded data.

The to-be-encoded data may be data stored in an encoding device, or may be data received by an encoding device from another device.

For example, the encoding device may be a node on a transmission path. The encoding device may receive data sent by an upstream node and use the data as the to-be-encoded data, or when the encoding device needs to send local data to a decoding device, the encoding device uses the local data as the to-be-encoded data.

402: Split the to-be-encoded data into phase data and amplitude data according to a preset rule.

After obtaining the to-be-encoded data, the encoding device splits the to-be-encoded data into the phase data and the amplitude data according to the preset rule.

The preset rule may specifically include: splitting to-be-encoded data into a plurality of data blocks based on a preset length, and then using one part of the data blocks as phase data and the other part of the data blocks as amplitude data. For example, the to-be-encoded data may be evenly split into two parts, to obtain phase data and amplitude data that are of a same length, or the to-be-encoded data may be split into two parts of different lengths, to obtain phase data and amplitude data, or the like.

403: Obtain a constellation diagram corresponding to the to-be-encoded data.

The constellation diagram includes a plurality of constellation points, the plurality of constellation points include a constellation point with an amplitude value of 0, each constellation point has a corresponding probability value, and the probability value indicates an occurrence probability of the corresponding constellation point.

The constellation diagram may be a multidimensional constellation diagram such as a two-dimensional, three-dimensional, four-dimensional, or six-dimensional constellation diagram. For example, the constellation points in the constellation diagram may be neatly arranged in a form of a matrix. For one of planes, refer to FIG. 5. The constellation points in the constellation diagram form a neat lattice, and one constellation point is adjacent to four constellation points. The constellation diagram is usually referred to as a Zn lattice, where n represents a dimension. For another example, the constellation points in the constellation diagram are not arranged in a matrix. For one of planes, refer to FIG. 6. One constellation point is adjacent to six constellation points. Usually, a two-dimensional constellation diagram with constellation points not arranged in a matrix may be referred to as an A2 lattice, and a four-dimensional constellation diagram with constellation points not arranged in a matrix may be referred to as a D4 lattice. In addition, in this application, transmission of more bit information is implemented especially for a constellation diagram with constellation points not neatly arranged in a form of a matrix such as A2 or D4. For example, A2 is a most densely arranged space of Euclid sphere spaces in two-dimensional spaces, and a density of constellation points in A2 is $\Delta = \pi/2\sqrt{3} = 0.9069$ . . . . In a case of a same minimum distance between constellation points and same information entropy, an average energy consumed when a constellation diagram of the A2 lattice is used is 0.42 dB less than an average energy consumed when a QAM constellation diagram based on a $Z^2$ lattice is used. That is, in the case of a same minimum distance between constellation points and same information entropy, if a same energy is used, more information bits are transmitted in a case of encoding by using the constellation diagram of the A2 lattice than a case of encoding by using the QAM constellation diagram of the $Z^2$ lattice.

It should be noted that when the constellation diagram is a multidimensional constellation diagram, the amplitude value mentioned in this application is an amplitude value obtained after amplitude values of a constellation point in all dimensions are calculated. An amplitude value of a constellation point is obtained by extracting a square root of a sum of squares of amplitude values in all dimensions. For example, if a constellation point is [xi, xq, yi, yq], an amplitude value of the constellation point is $\sqrt{xi^2 + xq^2 + yi^2 + yq^2}$. For the constellation point with an amplitude value of 0, an amplitude value in each dimension is 0. For example, if the D4 lattice is used in this application, the constellation point with an amplitude value of 0 is [0,0,0,0]. For another example, if the A2 lattice is used in this application, the constellation point with an amplitude value of 0 is [0,0].

In a possible implementation, a probability corresponding to each constellation point in the constellation diagram is related to information entropy, a quantity of constellation points, and an encoding length of probabilistic constellation shaping (PCS) encoding. The information entropy depends on a capacity of the to-be-encoded data. The capacity is an amount of bit data transmitted in a unit time. A larger capacity indicates larger information entropy included. Further, when the constellation diagram corresponding to the to-be-encoded data is obtained, reference may be made to a transmission rate of the to-be-encoded data. Different to-be-encoded data may have different constellation diagrams. For example, when the to-be-encoded data has a larger capacity, constellation points in a selected constellation diagram are more densely distributed, and the selected constellation diagram has more constellation points, thus implementing transmission of a larger amount of data. For example, if to-be-encoded data with a capacity of 400 Gbit/s is transmitted by an encoding device at a bandwidth of wo GHz, a determined constellation diagram includes at least 16 constellation points.

404: Perform probabilistic constellation shaping encoding on the amplitude data based on the constellation diagram and the probability value corresponding to each constellation point, to obtain at least one group of symbol sequences.

The encoding device performs PCS encoding on the amplitude data based on the constellation diagram determined in step 403 and the probability value corresponding to each constellation point, to obtain the at least one group of symbol sequences.

In a possible implementation, step 404 may specifically include: splitting the amplitude data into at least one group of segmented bit sequences based on a preset length; and performing PCS encoding on the at least one group of segmented bit sequences based on the constellation diagram, to obtain the at least one group of symbol sequences that is in a one-to-one correspondence with the at least one group of segmented bit sequences, where bits included in the at least one group of symbol sequences correspond to the occurrence probabilities of the constellation points in the constellation diagram.

Specifically, PCS encoding is mapping each group of segmented bit sequences to one group of symbol sequences in a preset mapping manner based on the occurrence probabilities of the constellation points in the constellation diagram. Amplitude values of the constellation points may be the same or different, and more amplitude value categories may be included (for example, the amplitude value may be 0, 1, 2, 3, 4, 5, or the like). The preset mapping manner may be mapping performed by using a preset algorithm, or may be mapping performed directly based on a mapping relationship. It may be understood as that PCS encoding is encoding in which m-bit sequences are mapped to n-bit sequences, where m and n are positive integers, and n is greater than m. n-bit sequences corresponding to different m-bit sequences are also different. Specifically, each bit included in the symbol sequence output after PCS encoding is performed is used to represent one constellation point, and an occurrence quantity of each constellation point in the symbol sequence matches a corresponding probability value. For example, if the amplitude values of the constellation points include 0 and 1, an occurrence probability of the constellation point with an amplitude value of 0 is 0.5, an occurrence probability of the constellation point with an amplitude value of 1 is 0.5, the output symbol sequence includes six bits, and each bit represents one constellation point, there may be three amplitude values of 0 and three amplitude values of 1 in the six bits. That is, an occurrence quantity of the constellation points with an amplitude value of 0 matches the probability of 0.5, and an occurrence quantity of the constellation points with an amplitude value of 1 matches the probability of 0.5.

In an example scenario, a manner of searching a mapping table may be used to implement PCS encoding, to map m-bit sequences to n-symbol sequences, where the n-symbol sequence is a symbol including at least n bits. A mapping relationship between the m-bit sequences and the corresponding n-symbol sequences may be stored in the mapping table. Bits included in an output symbol sequence in the mapping table correspond to occurrence probabilities of constellation points in the constellation diagram. Because there are $2^m$ bit sequences, the corresponding table includes at least $2^m*n$ bits. During PCS encoding, the mapping table is searched by a value corresponding to an m-bit sequence, to output a corresponding n-symbol symbol sequence. For example, an example is used in which m=4 and n=6. For the mapping table, refer to Table 1 below, in which probabilities of a symbol 0 and a symbol 1 are both equal to 0.5.

TABLE 1

| Input bit sequence | Output symbol sequence |
|---|---|
| 0000 | 000111 |
| 0001 | 001110 |
| 0010 | 001101 |
| 0011 | 001011 |
| 0100 | 010011 |
| 0101 | 010101 |
| 0110 | 010110 |
| 0111 | 011001 |
| 1000 | 011010 |
| 1001 | 011100 |
| 1010 | 100011 |
| 1011 | 100110 |
| 1100 | 101001 |
| 1101 | 101010 |
| 1110 | 101100 |
| 1111 | 110001 |

In Table 1, each symbol in the output symbol sequence indicates an amplitude index of a constellation point. In addition, occurrence quantities of constellation points in the output symbol sequence in Table 1 correspond to probability values of the constellation points. For example, in Table 1, an occurrence probability of a constellation point with an amplitude index of 0 is 0.5, and an occurrence probability of a constellation point with an amplitude index of 1 is 0.5; and occurrence quantities of the constellation points in Table 1 match the probabilities.

The step of performing PCS encoding may specifically include: splitting the amplitude data into a plurality of groups of 4-bit bit sequences, and then searching the mapping table, to obtain corresponding 6-bit symbol sequences. For example, if an m-bit sequence is "0010", a corresponding output symbol sequence is "001101".

Besides, the output symbol sequence may further include more values, for example, 2, 3, 4, and 5. Different values represent different amplitudes. For example, a bit with a value of 2 represents an amplitude value of 2 or an index of a second category of amplitude values obtained after amplitude values are sorted; a bit with a value of 3 represents an amplitude value of 3 or an index of a third category of amplitude values obtained after amplitude values are sorted; a bit with a value of 4 represents an amplitude value of 4 or an index of a fourth category of amplitude values obtained after amplitude values are sorted; a bit with a value of 5 represents an amplitude value of 5 or an index of a fifth category of amplitude values obtained after amplitude values are sorted; . . . . The rest can be deduced by analogy.

405: Combine the at least one group of symbol sequences and the phase data, and then performing encoding, to obtain output data.

After the at least one group of symbol sequences is obtained, the at least one group of symbol sequences and the phase data may be combined, and the combined data may be encoded, to obtain the output data.

In a possible implementation, the at least one group of symbol sequences is split into at least two categories of symbol sequences, including a first category of symbol sequences and a second category of symbol sequences, where amplitude values of the first category of symbol sequences are not 0, and amplitude values of the second category of symbol sequences are 0. Then, the first category of symbol sequences and the phase data are combined, to obtain phase and amplitude combined data. Then, the second category of symbol sequences and the phase and amplitude combined data are combined, to obtain the output data.

In a possible implementation, before step 405, the method provided in this embodiment may further include: obtaining check data of the phase data and the at least one group of symbol sequences. Specifically, the phase data and the at least one group of symbol sequences may be combined and then input into an FEC encoder, and FEC encoding may be performed on the phase data and the at least one group of symbol sequences, to obtain the check data.

A specific process of FEC encoding may include: The data obtained after the phase data and the at least one group of symbol sequences are combined may be expressed as $u=(u_1, u_2, u_3, \ldots, u_{a-1})$, and the u is encoded by using a preset generator matrix, to obtain the check data $V=(v_1, v_2, v_3, \ldots, v_{b-1})$, where $$V = u * G, \quad G = \begin{bmatrix} g0 \\ g1 \\ \vdots \\ ga-1 \end{bmatrix} \begin{bmatrix} g_{0,1}g_{0,1} & \cdots & g_{0,b-1} \\ g_{1,1}g_{1,1} & \cdots & g_{0,b-1} \\ \vdots & \ddots & \vdots \\ g_{a-1,1}g_{a-1,1} & \cdots & g_{a-1,b-1} \end{bmatrix}.$$

After the check data is obtained, the check data is further added to be combined when the first category of symbol sequences with an amplitude value that is not 0 and the phase data are combined. Specifically, the check data and the phase data may be combined, to obtain phase and check combined data. For example, the check data is added to a head or tail of the phase data, to obtain the phase and check combined data. Then, the phase and check combined data and the first category of symbol sequences with an amplitude value that is not 0 are combined, to obtain the phase and amplitude combined data.

More specifically, the at least one group of symbol sequences obtained in step 404 are amplitude indexes of the constellation points that are in the constellation diagram and to which the amplitude data is mapped. Values of indexes of amplitude values may be of K+1 categories, an index corresponding to the amplitude value 0 is 0, and K is a positive integer. For example, if the bit sequence "0010" is mapped to "001202", "2" in "001202" represents an amplitude index of a mapped-to constellation point, and indicates that an amplitude value of the constellation point belongs to a second category of amplitude values. If the constellation diagram includes constellation points with amplitude values of 0, 2, 4, and 6, and the amplitude values are arranged in ascending order, a $0^{th}$ category of amplitude values includes 0, a first category of amplitude values includes 2, a second category of amplitude values includes 4, and a third category of amplitude values includes 6. Certainly, the amplitude values may alternatively not be sorted by sizes of the amplitude values. For example, the amplitude values are arranged in a manner of 0, 4, 6, and 2. In this case, the $0^{th}$ category of amplitude values includes 0, the first category of amplitude values includes 4, the second category of amplitude values includes 6, and the third category of amplitude values includes 2.

That the at least one group of symbol sequences are amplitude indexes of the constellation points that are in the constellation diagram and to which the amplitude data is mapped is more specifically described below.

When the check data of the phase data and the at least one group of symbol sequences is obtained, amplitude indexes may be converted into binary-identified values. For example, when there are four amplitude value categories, an amplitude index 0 is expressed as "00", an amplitude index 1 is expressed as "01", an amplitude index 2 is expressed as "11", and an amplitude index 3 is expressed as "10". When there are more amplitude value categories, amplitude indexes may be expressed by using more bits. For example, when there are six amplitude value categories, three bits may be used to express amplitude indexes. An amplitude index 0 is expressed as "000", an amplitude index 1 is expressed as "010", and the like. The rest can be deduced by analogy.

That the phase data and the first category of symbol sequences with an amplitude value that is not 0 are combined, to obtain phase and amplitude combined data may specifically include: classifying bits included in the first category of symbol sequences, to obtain K groups of amplitude bit sequences, where amplitude indexes of bits included in a same group of amplitude bit sequences have a same value; then, splitting the phase and check combined data, to obtain K groups of phase bit sequences that are in a one-to-one correspondence with the K groups of amplitude bit sequences, where a length of each of the K groups of phase bit sequences is related to values of amplitude indexes of the corresponding group of amplitude bit sequences; and then, combining each of the K groups of amplitude bit sequences and a corresponding group of phase bit sequences, to obtain K groups of bit sequences, where the K groups of bit sequences form the phase and amplitude combined data, and lengths of at least two of the K groups of bit sequences are different.

Optionally, the combining each of the K groups of amplitude bit sequences and a corresponding group of phase bit sequences may specifically include: performing mapping on the K groups of phase bit sequences in a preset manner, to obtain K groups of phase-mapped bit sequences; and then, performing operation on each of the K groups of phase-mapped bit sequences and a corresponding group of amplitude bit sequences, to obtain the K groups of bit sequences. The operation may specifically include but is not limited to an operation, for example, a product operation, a tensor product operation, or table lookup.

Optionally, after encoding the to-be-encoded data and obtaining the output data, the encoding device further sends the output data to the decoding device. The decoding device may decode the output data and extract data included in the output data. As such, transmission of the to-be-encoded data is successfully completed.

Therefore, in the implementations in this application, because the selected constellation diagram includes the constellation point with an amplitude value of 0, smaller information entropy can be implemented based on the constellation point with an amplitude value of 0. For example, when smaller information entropy is required, an occurrence probability of the constellation point with an amplitude value of 0 may be increased, whereas when larger information entropy is required, an occurrence probability of the constellation point with an amplitude value of 0 may be reduced, or a quantity of categories of amplitude values in the constellation diagram may be increased, or the like. Therefore, the encoding method provided in this embodiment of this application can implement more flexible information entropy.

The following describes in more detail the encoding method provided in this application.

Figure 7:
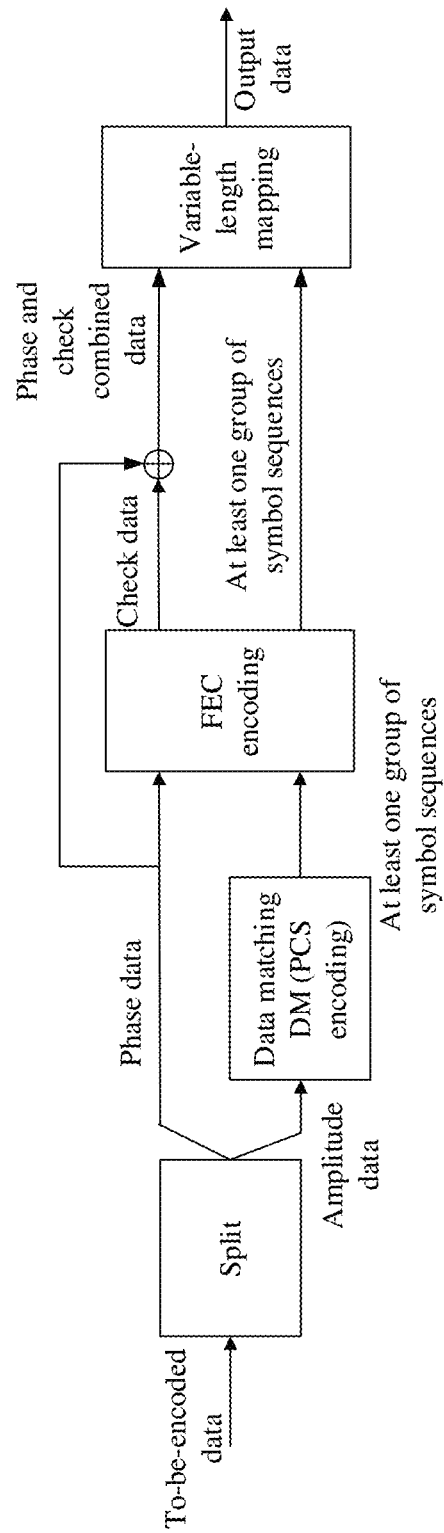
FIG. 7 is a schematic flowchart of another encoding method according to this application.

For example, FIG. 7 is a schematic diagram of an embodiment of another encoding method according to this application.

First, an encoding device obtains to-be-encoded data and splits the to-be-encoded data into phase data and amplitude data.

Then, the encoding device performs data matching encoding on the amplitude data, to obtain at least one group of symbol sequences, where PCS encoding is used in this embodiment. In addition, before performing PCS encoding, the encoding device selects a constellation diagram, and determines an occurrence probability of each constellation point in the constellation diagram. The at least one group of symbol sequences includes amplitude indexes of amplitude values of constellation points to which the amplitude data is mapped.

For example, a D4 lattice is used as an example for description in this embodiment. For one of planes of the constellation diagram, refer to FIG. 6. Each constellation point may be expressed as [xi,xq,yi,yq], and energy of each constellation point may be expressed as $xi^2+xq^2+yi^2+yq^2$.

There is one constellation point with energy of 0, an amplitude index of the constellation point is 0, and the constellation point specifically includes:

[0 0 0 0]

There are 24 constellation points with energy of 2, an amplitude index of the constellation points is 1, and the constellation points specifically include:

[±1 ±1 0 0], [±1 0 0 ±1], [±1 0 ±1 0],

[0 ±1 ±1 0], [0 ±1 0 ±1], [0 0 ±1 ±1]

There are 24 constellation points with energy of 4, an amplitude index of the constellation points is 2, and the constellation points specifically include:

[±2 0 0 0], [0 ±2 0 0], [0 0 ±2 0], [0 0 ±2 0]

[±1 ±1 ±1 ±1]

There are 96 constellation points with energy of 6, an amplitude index of the constellation points is 3, and the constellation points specifically include:

[±2 ±1 ±1 0], [±2 ±1 0 ±1], [±2 0 ±1 ±1],

[±1 ±2 ±1 0], [±1 ±2 0 ±1], [0 ±2 ±1 ±1],

[±1 ±1 ±2 0], [±1 0 ±2 ±1], [0 ±1 ±2 ±1],

[±1 ±1 0 ±2], [±1 0 ±1 ±2], [0 ±1 ±1 ±2],

To implement PCS encoding with information entropy of 1, the amplitude index 0 and the amplitude index 1 may be selected. A total quantity of constellation points is 1+24=25, that is, including the constellation point with energy of 0 and the constellation points with energy of 2. Occurrence probabilities of the constellation points are adjusted, and the probabilities of the 24 constellation points with an amplitude index of 1 are the same. Therefore, the occurrence probabilities of the 25 constellation points are set to [0.328, 0.028, 0.028, ..., 0.028], where "0.328" is the occurrence probability of the constellation point with energy of 0.

In this case, average information entropy of each symbol is $-0.328 * \log_2(0.328) - 0.028 * \log_2(0.028) * 24 \approx 4$.

An average energy of each symbol is $0.028 * 2 * 24 = 1.344$.

For QPSK constellation points (±1, ±1, ±1, ±1)/sqrt(2) in an existing solution, average information entropy of each symbol is 4, and an average energy of each symbol is 2.

Obviously, the energy of each symbol in this embodiment is smaller than that in the QPSK constellation diagram in the existing solution.

Therefore, in this embodiment, transfer of more information entropy by using a smaller energy can be implemented by using a constellation diagram and distribution of probabilities of constellation points.

Then, the encoding device combines the at least one group of symbol sequences and the phase data, and inputs the combined data into an FEC encoder for encoding. The at least one group of symbol sequences includes values of amplitude indexes. Therefore, amplitude indexes included in at least one group of amplitude indexes need to be converted into a plurality of binary bits. For example, when there are four categories of amplitude indexes, "0" is converted into "00", "1" is converted into "01", "2" is converted into "10", "3" is converted into "ii", and the like. The FEC encoder outputs check data of the phase data and the at least one group of symbol sequences.

The encoding device combines the check data and the phase data into phase and check combined data, and combines the phase and check combined data and the at least one group of symbol sequences, to obtain output data. In this embodiment, the combining the phase and check combined data and the at least one group of symbol sequences, to obtain output data is performing variable-length mapping on the phase and check combined data and the at least one group of symbol sequences, to obtain the output data.

Figure 8:
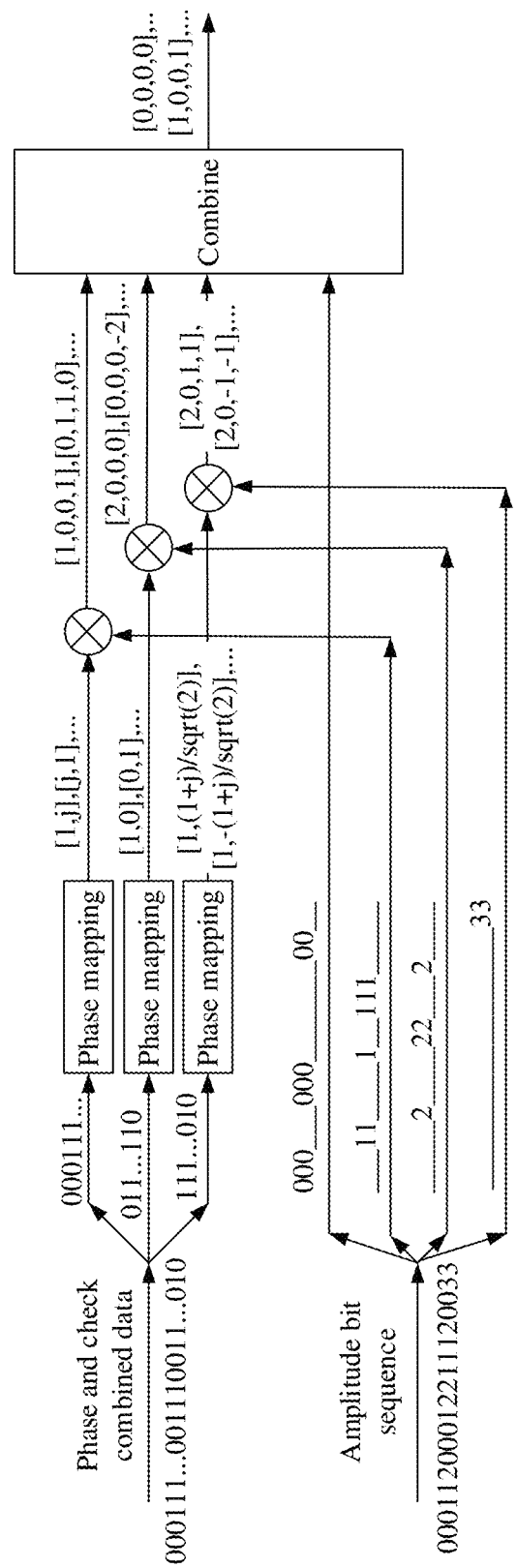
FIG. 8 is a schematic diagram of variable-length mapping according to this application.

For example, for variable-length mapping, refer to FIG. 8.

An amplitude bit sequence (that is, the at least one group of symbol sequences) is split, to obtain K+1 groups of amplitude bit sequences, including one group of amplitude bit sequences with an amplitude index value of 0 and K groups of amplitude bit sequences with an amplitude index value that is not 0. When the amplitude bit sequence is split, the phase and check combined data is also correspondingly split, where a length used when the phase and check combined data is split is related to values of amplitude indexes of the corresponding group of amplitude bit sequences. Specifically, the amplitude bit sequence may be split in units of a preset quantity of bits, that is, each group of amplitude bit sequences includes the preset quantity of bits. A quantity of bits included in each group of phase bit sequences is determined based on a corresponding amplitude index value and the preset quantity.

For example, in the K groups of amplitude bit sequences with an amplitude index value that is not 0, each group of amplitude bit sequences includes two bits. One of the K groups of amplitude bit sequences is used as an example. A quantity of bits included in a phase bit sequence corresponding to the group of amplitude bit sequences is determined based on an amplitude index value included in the amplitude bit sequence. If the amplitude index value included in the amplitude bit sequence is 2, the quantity of bits included in the corresponding phase bit sequence is 9. It may be understood as: There are 24 constellation points with an amplitude index of 2, and two bits with an amplitude index of 2 represent 576 (24*24=576) possible constellation point combinations. A possible value of each bit in the phase bit sequence includes 0 or 1, and therefore, there are 512 ($2^9$=512) possible bit sequence combinations corresponding to nine bits. 512 is not greater than a quantity of possible constellation points in the two bits with an amplitude index of 2. That is, combinations of the possible constellation points in the two bits with an amplitude index value of 2 may include bit sequence combinations corresponding to nine bits. If the amplitude index value included in the amplitude bit sequence is 3, the quantity of bits included in the corresponding phase bit sequence is 13. It may be understood as: There are 96 constellation points with an amplitude index of 3, and two bits with an amplitude index value of 3 represent 9216 (96*96=9216) possible constellation point combinations. A possible value of each bit in the phase bit sequence includes 0 or 1, and therefore, 13 phase bits have 8192 ($2^{13}$=8192) possible combinations. 8192 is not greater than a quantity of possible constellation points in the two bits with an amplitude index value of 3. That is, combinations of the possible constellation points in the two bits with an amplitude index value of 3 may include possible bit sequence combinations of 13 bits.

After splitting the phase and check combined data, the encoding device performs phase mapping on each group of phase bit sequences obtained after the splitting, and maps the groups of phase bit sequences to combinations of different phases such as 0, $\pi/2$, $\pi$, and $-\pi/2$, to obtain groups of phase-mapped bit sequences that are in a one-to-one correspondence with the groups of phase bit sequences. Then, the encoding device performs product operation on each group of phase-mapped bit sequences and a corresponding group of amplitude bit sequences, to obtain K groups of bit sequences that are in a one-to-one correspondence with the groups of phase-mapped bit sequences.

For example, each time two bits with an amplitude index value of 1 are split from the amplitude bit sequence, nine bits are split from the phase and check combined data, phase mapping is then performed on the nine bits, and after the nine bits are mapped to combinations of different phases such as 0, $\pi/2$, $\pi$, and $-\pi/2$, tensor product operation is performed on the combinations of different phases and the two bits with an amplitude index value of 1, to obtain one group of bit sequences; each time two bits with an amplitude index value of 2 are split from the amplitude bit sequence, nine bits are split from the phase and check combined data, phase mapping is then performed on the nine bits, and after the nine bits are mapped to combinations of different phases such as 0, $\pi/2$, $\pi$, and $-\pi/2$, tensor product operation is performed on the combinations of different phases and the two bits with an amplitude index value of 2, to obtain one group of bit sequences; and each time two bits with an amplitude index value of 3 are split from the amplitude bit sequence, 13 bits are split from the phase and check combined data, phase mapping is then performed on the 13 bits, and after the 13 bits are mapped to combinations of different phases such as 0, $\pi/2$, $\pi$, and $-\pi/2$, tensor product operation is performed on the combinations of the different phases and the two bits with an amplitude index value of 3, to obtain one group of bit sequences. The rest can be deduced by analogy, to obtain the K groups of bit sequences.

The encoding device combines the K groups of bit sequences and the group of amplitude bit sequences with an amplitude index of 0. In this way, the output data can be obtained.

In this embodiment, because the constellation point with an amplitude index of 0 is directly combined and does not undergo processing with the phase data, the constellation point with an amplitude index of 0 carries least information. Therefore, smaller information entropy can be obtained by increasing an occurrence probability of the constellation point with an amplitude index of 0. If larger information entropy is required, the information entropy can be increased by increasing a quantity of amplitude value categories and/or reducing an occurrence probability of the constellation point with an amplitude value of 0. For example, because the constellation point with an amplitude index of 0 does not have phase information, and there are 24 constellation points with an amplitude index of 1 and 24 constellation points with an amplitude index of 2, at least information of more than four bits (log 2(24)>4) may be included; and because there are 96 different constellation points with an amplitude index of 3, information of more than six bits (log 2(96)>6) may be included. Therefore, more flexible information entropy can be implemented.

The foregoing describes in detail the encoding method provided in this application. The following describes the decoding method provided in this application.

Figure 9:
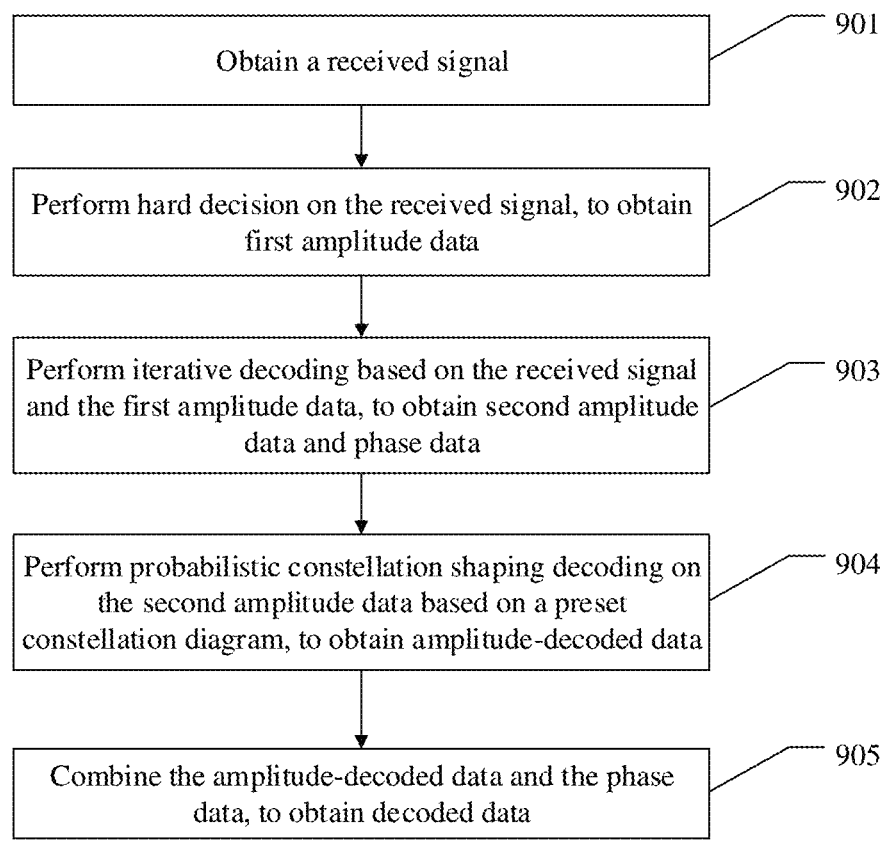
FIG. 9 is a schematic flowchart of a decoding method according to this application.

With reference to FIG. 9, the following describes in detail the decoding method provided in this application. The decoding method includes the following steps.

901: Obtain a received signal.

After encoding to-be-encoded data, an encoding device sends the encoded data to a decoding device through a communication network. The decoding device receives a received signal sent by the encoding device. For the communication network, refer to a related description about FIG. 1A.

902: Perform hard decision on the received signal, to obtain first amplitude data.

After receiving the received signal, the decoding device performs hard decision on the received signal, to obtain the first amplitude data.

Specifically, the decoding device performs hard decision on an amplitude value of the received signal, to obtain an amplitude value of each bit. For example, if an amplitude value of a received bit is 0, the decoding device decides the amplitude value of the bit as 0; if an amplitude value of a received bit is between 0 and 1, the decoding device decides the amplitude value of the bit as 1; if an amplitude value of a received bit is between 1 and 2, the decoding device decides the amplitude value of the bit as 2; . . . . The rest can be deduced by analogy.

903: Perform iterative decoding based on the received signal and the first amplitude data, to obtain second amplitude data and phase data.

After the first amplitude data is obtained, iterative decoding is performed based on the received signal and the first amplitude data, to obtain the second amplitude data and the phase data.

Specifically, an iterative decoding process may include: performing iterative decoding for N times based on the received signal and the first amplitude data, to obtain the second amplitude data and the phase data, where N is a positive integer, and the phase data is obtained after an $N^{th}$ decoding is performed.

During first decoding, the decoding device calculates a log likelihood ratio (LLR) based on the received signal and the first amplitude data, and then, performs FEC decoding on the first LLR, to obtain amplitude data of the first decoding. The amplitude data and the received signal are used as input data for next decoding.

The $M^{th}$ decoding is used as an example: obtaining amplitude data of an (M−1)th decoding; splitting the received signal into K groups of amplitude bit sequences based on the amplitude data of the (M−1)th decoding, where K is a positive integer; obtaining a quantity of bits included in each of the K groups of amplitude bit sequences; obtaining, based on the quantity of bits included in each group of amplitude bit sequences and the received signal, LLR information for the $M^{th}$ decoding; and performing FEC decoding on the LLR information for the $M^{th}$ decoding, to obtain amplitude data of the $M^{th}$ decoding.

In addition, the quantity of bits included in each group of amplitude bit sequences is related to amplitude values of bits in the corresponding group of amplitude bit sequences. For example, if an amplitude value is 3, a corresponding quantity of bits is 13, and if an amplitude value is 2, a corresponding quantity of bits is 9.

For example, an LLR value of an $n^{th}$ bit in the first amplitude data is calculated as follows:

$$LLR_n = \ln \frac{\sum_{c \in C_n^+} p(c|s)}{\sum_{c \in C_n^-} p(c|s)} = \ln \frac{\sum_{c \in C_n^+} p(s|c)p(c)/p(s)}{\sum_{c \in C_n^-} p(s|c)p(c)/p(s)} = \ln \frac{\sum_{c \in C_n^+} p(s|c)}{\sum_{c \in C_n^-} p(s|c)}$$

The received signal is s; c is a set of assumed transmitted symbols; $C_n^+$, $C_n^-$ are a transmit constellation point collection that enables a value of the $n^{th}$ bit to be 1 and a transmit constellation point collection that enables a value of the $n^{th}$ bit to be 0, respectively; p(s|c) represents a probability that s is received when c is transmitted; and p(c|s) represents a probability that c is transmitted when s is received.

After the LLR value is calculated, more accurate amplitude data can be obtained through FEC decoding, because the received signal may have noise, resulting in erroneous determining in the hard decision or LLR calculation. A specific FEC decoding manner may include: A check matrix is preset in the decoding device.

$$H = \begin{bmatrix} h0 \\ h1 \\ \vdots \\ ha-1 \end{bmatrix} \begin{bmatrix} h_{0,1}h_{0,1} & \cdots & h_{0,b-1} \\ h_{1,1}h_{1,1} & \cdots & h_{0,b-1} \\ \vdots & \ddots & \vdots \\ h_{a-1,1}h_{a-1,1} & \cdots & h_{a-1,b-1} \end{bmatrix}$$

In addition, G·H=0. For G, refer to the generator matrix described in step 405. Therefore, whether there is erroneous determining in the output LLR obtained through calculation can be verified by using H. A specific verification manner is C={v∈ V:v·$H^T$=0}, where C is output amplitude data, and V is a collection of LLR values obtained through calculation.

During the $N^{th}$ decoding, decoded data output by an FEC decoder is split in a preset manner, to obtain the second amplitude data and the phase data. The preset manner is a manner agreed upon by the encoding device and the decoding device, and is a reverse of a manner in which the encoding device combines the at least one group of symbol sequences and the phase data before performing FEC encoding. The step of splitting the decoded data is a reverse process of the manner of combining the at least one group of symbol sequences and the phase data in step 405. For example, if first y bits are the at least one group of symbol sequences and last q bits are the phase data when the at least one group of symbol sequences and the phase data are spliced in step 405, the decoding device splits the first y bits as the second amplitude data and the last q bits as the phase data when splitting the output decoded data.

In addition, because a value of a bit included in the amplitude data is an amplitude index, the amplitude index in the value of the amplitude data is replaced with corresponding binary bits before FEC decoding is performed. For example, if there are four categories of amplitude index values, an amplitude index value 0 is replaced with "00", an amplitude index value 1 is replaced with "01", an amplitude index value 2 is replaced with "10", and an amplitude index value 3 is replaced with "11".

Figure 10:
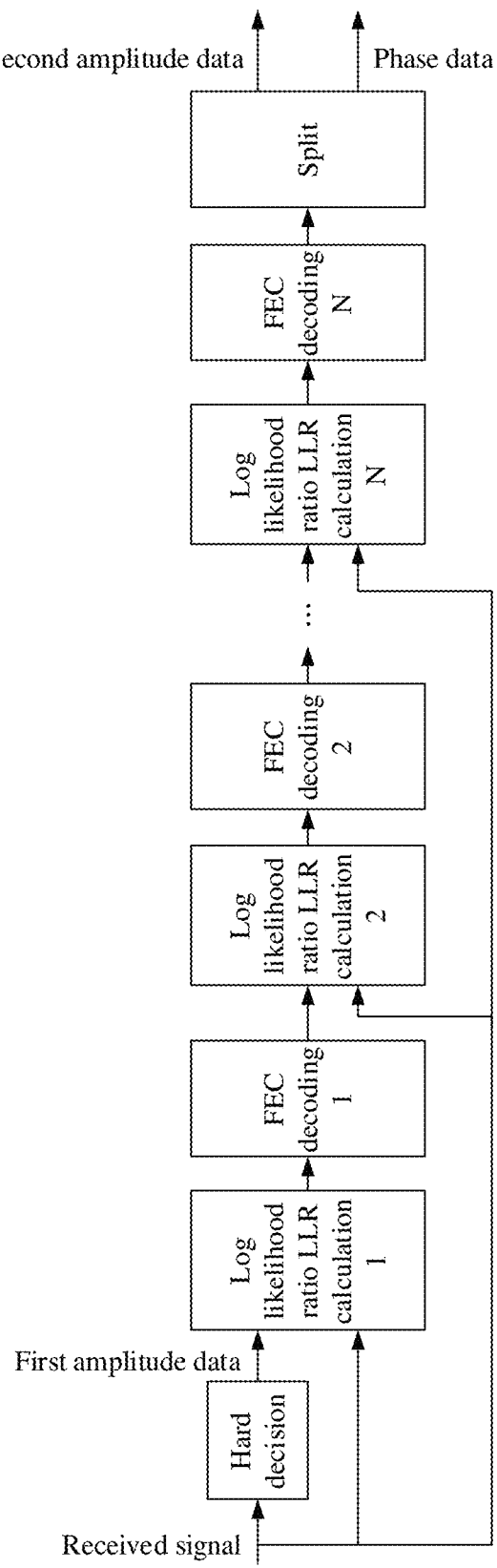
FIG. 10 is a schematic flowchart of another decoding method according to this application.

For example, as shown in FIG. 10, after performing hard decision on the received signal to obtain the first amplitude data, the decoding device performs first LLR calculation on the first amplitude data with reference to the received signal, and then, performs first FEC decoding on LLR information obtained through the first LLR calculation, to obtain amplitude data obtained through first FEC decoding. Then, the decoding device performs second LLR calculation based on the amplitude data obtained through the first FEC decoding and the received signal, to obtain LLR information, and performs second FEC decoding on the LLR information obtained through the second LLR calculation, to obtain amplitude data after second FEC decoding, and so on. During the $N^{th}$ decoding, the decoding device calculates LLR information based on LLR information obtained through the $(N-1)^{th}$ FEC decoding and the received signal, and performs FEC decoding on LLR information obtained through the $N^{th}$ LLR calculation, to obtain amplitude data of the $N^{th}$ decoding. The decoding device splits the amplitude data of the $N^{th}$ decoding, to obtain the second amplitude data and the phase data.

904: Perform probabilistic constellation shaping decoding on the second amplitude data based on a preset constellation diagram, to obtain amplitude-decoded data.

After the second amplitude data is obtained, PCS decoding is performed on the second amplitude data based on the preset constellation diagram, to obtain the amplitude-decoded data. For the constellation diagram, refer to a related description in step 403. Details are not described herein again.

Specifically, a PCS decoding process and the PCS encoding process described in step 403 are reverses of each other. If PCS encoding is performed by using a preset algorithm, corresponding PCS decoding is performed based on reverse operation of the preset algorithm.

For example, if PCS encoding is performed based on the foregoing mapping table, PCS decoding in this embodiment may also be performed based on the foregoing mapping table. For example, a mapping table stored in the decoding device may be Table 2.

TABLE 2

| Input symbol sequence | Output bit sequence |
| --- | --- |
| 000111 | 0000 |
| 001110 | 0001 |
| 001101 | 0010 |
| 001011 | 0011 |
| 010011 | 0100 |
| 010101 | 0101 |
| 010110 | 0110 |
| 011001 | 0111 |
| 011010 | 1000 |
| 011100 | 1001 |
| 100011 | 1010 |
| 100110 | 1011 |
| 101001 | 1100 |
| 101010 | 1101 |
| 101100 | 1110 |
| 110001 | 1111 |

Table 2 is similar to Table 1, and details are not described herein again. A difference is that the output symbol sequence in Table 1 is the input symbol sequence in Table 2, and the input bit sequence in Table 1 is the output bit sequence in Table 2.

After obtaining the second amplitude data, the decoding device may split the second amplitude data into at least one group of symbol sequences based on a decoding length of PCS decoding, and then search the mapping table to map the at least one group of symbol sequences to at least one group of segmented bit sequences that is in a one-to-one correspondence with the at least one group of symbol sequences. The at least one group of segmented bit sequences is the amplitude-decoded data. For example, if one of the at least one group of symbol sequences is "110001", a mapped-to bit sequence is "1111".

905: Combine the amplitude-decoded data and the phase data, to obtain decoded data.

After obtaining the amplitude-decoded data, the decoding device combines the amplitude-decoded data and the phase data, to obtain the decoded data.

It may be understood as that a specific manner of combining the amplitude-decoded data and the phase data and step 402 may be reverse processes of each other. For example, if the encoding device evenly splits the to-be-encoded data into two pails, the amplitude-decoded data and the phase data may be directly combined to obtain the decoded data.

Therefore, in this embodiment, the decoding device may perform PCS decoding on the second amplitude data based on the preset constellation diagram, to obtain the corresponding amplitude-decoded data. The constellation diagram includes a plurality of constellation points, the constellation diagram includes a constellation point with an amplitude value of 0, each constellation point has a corresponding probability value, and the probability value indicates an occurrence probability of the corresponding constellation point. Therefore, the decoding device may decode the received signal based on the probability values, to obtain the accurate decoded data, and extract data included in the received signal. In this way, more flexible information entropy can be implemented, or receive data including larger information entropy can be received.

An embodiment of this application further provides a digital processing chip. The digital processing chip integrates a circuit and one or more interfaces that are used to implement the TxDSP 201 or RxDSP 307 or a function of the TxDSP 201 or RxDSP 307. When a memory is integrated into the digital processing chip, the digital processing chip may complete the method steps in any one or more of the foregoing embodiments corresponding to FIG. 1A to FIG. 9. When a memory is not integrated into the digital processing chip, the digital processing chip may be connected to an external memory through an interface. The digital processing chip implements, based on program code stored in an external memory, actions performed by the encoding device or decoding device in the foregoing embodiments.

Persons of ordinary skill in the art may understand that all or some of the steps of the foregoing embodiments may be implemented by a program instructing related hardware. The program may be stored in a computer-readable storage medium. The storage medium mentioned may be a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When software is used to implement the embodiments, the method steps in the foregoing embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An encoding method, comprising:
   splitting to-be-encoded data into phase data and amplitude data according to a preset rule;
   obtaining a constellation diagram corresponding to the to-be-encoded data, wherein the constellation diagram comprises a plurality of constellation points, the plurality of constellation points comprises a constellation point with an amplitude value of zero (0), each constellation point of the plurality of constellation points has a corresponding probability value, and each respective probability value indicates an occurrence probability of the corresponding constellation point;
   performing probabilistic constellation shaping encoding on the amplitude data based on the constellation diagram and the probability value corresponding to each constellation point, to obtain at least one group of symbol sequences; and
   combining the at least one group of symbol sequences and the phase data, and performing encoding, to obtain output data.

2. The method according to claim 1, wherein the probability value corresponding to each constellation point in the constellation diagram is determined based on information entropy, a quantity of constellation points in the plurality of constellation points, and an encoding length of the probabilistic constellation shaping encoding, and wherein the information entropy depends on a capacity of the to-be-encoded data.

3. The method according to claim 1, wherein combining the at least one group of symbol sequences and the phase data, and performing encoding, to obtain the output data, comprises:
   splitting the at least one group of symbol sequences into at least two categories of symbol sequences, wherein the at least two categories comprise a first category of symbol sequences and a second category of symbol sequences, amplitude values of the first category of symbol sequences are not zero (0), and amplitude values of the second category of symbol sequences are zero (0);
   combining the first category of symbol sequences and the phase data, to obtain phase and amplitude combined data; and
   combining the second category of symbol sequences and the phase and amplitude combined data, to obtain the output data.

4. The method according to claim 3, further comprising:
   obtaining check data of the phase data and the at least one group of symbol sequences; and
   wherein combining the first category of symbol sequences and the phase data, to obtain the phase and amplitude combined data comprises:
   combining the check data and the phase data, to obtain phase and check combined data; and
   combining the phase and check combined data and the first category of symbol sequences, to obtain the phase and amplitude combined data.

5. The method according to claim 4, wherein the at least one group of symbol sequences are amplitude indexes of the constellation points that are in the constellation diagram and to which the amplitude data is mapped, there are K+1 categories of values of the amplitude indexes, and K is a positive integer; and
   wherein combining the phase and check combined data and the first category of symbol sequences, to obtain the phase and amplitude combined data, comprises:
   classifying bits comprised in the first category of symbol sequences, to obtain K groups of amplitude bit sequences, wherein amplitude indexes of bits comprised in a same group of amplitude bit sequences have a same value;
   splitting the phase and check combined data, to obtain K groups of phase bit sequences that are in a one-to-one correspondence with the K groups of amplitude bit sequences, wherein a length of each group of the K groups of phase bit sequences is associated with values of amplitude indexes of the corresponding group of amplitude bit sequences; and
   performing an operation on each of the K groups of amplitude bit sequences and a corresponding group of phase bit sequences, to obtain K groups of bit sequences, wherein lengths of at least two groups of the K groups of bit sequences are different, and the combined data is the K groups of bit sequences.

6. The method according to claim 5, wherein performing the operation on each group of the K groups of amplitude bit sequences and the corresponding group of phase bit sequences comprises:
   performing mapping on the K groups of phase bit sequences in a preset manner, to obtain K groups of phase-mapped bit sequences; and
   performing the operation on each of the K groups of phase-mapped bit sequences and a corresponding group of amplitude bit sequences, to obtain the K groups of bit sequences.

7. The method according to claim 1, wherein performing probabilistic constellation shaping encoding on the amplitude data based on the constellation diagram and the probability value corresponding to each constellation point comprises:
  splitting the amplitude data into at least one group of segmented bit sequences based on a preset length; and
  performing probabilistic constellation shaping (PCS) encoding on each of the at least one group of segmented bit sequences based on the constellation diagram, to obtain the at least one group of symbol sequences that is in a one-to-one correspondence with the at least one group of segmented bit sequences, wherein bits comprised in the at least one group of symbol sequences correspond to the occurrence probabilities of the constellation points.

8. A method, comprising:
  obtaining a received signal;
  performing hard decision on the received signal, to obtain first amplitude data;
  performing iterative decoding based on the received signal and the first amplitude data, to obtain second amplitude data and phase data;
  performing probabilistic constellation shaping decoding on the second amplitude data based on a preset constellation diagram, to obtain amplitude-decoded data, wherein the constellation diagram comprises a plurality of constellation points, the constellation diagram comprises a constellation point with an amplitude value of zero (0), each constellation point of the plurality of constellation points has a corresponding probability value, and each respective probability value indicates an occurrence probability of the corresponding constellation point; and
  combining the amplitude-decoded data and the phase data, to obtain decoded data.

9. The method according to claim 8, wherein performing iterative decoding based on the received signal and the first amplitude data, to obtain the second amplitude data and phase data, comprises:
  performing iterative decoding for N times based on the received signal and the first amplitude data, to obtain the second amplitude data and the phase data, wherein the phase data is obtained after an $N^{th}$ decoding is performed, and N is a positive integer; and
  wherein an $M^{th}$ decoding in the iterative decoding of the N times comprises:
    obtaining amplitude data of an $(M-1)^{th}$ decoding, wherein M is a positive integer;
    splitting the received signal into K groups of amplitude bit sequences based on the amplitude data of the $(M-1)^{th}$ decoding, wherein K is a positive integer;
    obtaining a quantity of bits comprised in each of the K groups of amplitude bit sequences;
    obtaining, based on the quantity of bits comprised in each group of amplitude bit sequences and the received signal, log likelihood ratio (LLR) information for the $M^{th}$ decoding; and
    performing forward error correction (FEC) decoding on the LLR information for the $M^{th}$ decoding, to obtain amplitude data of the $M^{th}$ decoding.

10. The method according to claim 9, wherein the quantity of bits comprised in each group of amplitude bit sequences of the K groups of amplitude bit sequences is related to an amplitude value of the corresponding group of amplitude bit sequences.

11. An encoding device, comprising:
  a processor; and
  a memory, wherein the memory and the processor are interconnected, the memory stores instructions, and the processor is configured to perform operations comprising:
    splitting to-be-encoded data into phase data and amplitude data according to a preset rule;
    obtaining a constellation diagram corresponding to the to-be-encoded data, wherein the constellation diagram comprises a plurality of constellation points, the plurality of constellation points comprises a constellation point with an amplitude value of zero (0), each constellation point of the plurality of constellation points has a corresponding probability value, and each respective probability value indicates an occurrence probability of the corresponding constellation point;
    performing probabilistic constellation shaping encoding on the amplitude data based on the constellation diagram and the probability value corresponding to each constellation point, to obtain at least one group of symbol sequences; and
    combining the at least one group of symbol sequences and the phase data, and performing encoding, to obtain output data.

12. The encoding device according to claim 11, wherein the probability value corresponding to each constellation point in the constellation diagram is determined based on information entropy, a quantity of constellation points in the plurality of constellation points, and an encoding length of the probabilistic constellation shaping encoding, and wherein the information entropy depends on a capacity of the to-be-encoded data.

13. The encoding device according to claim 11, wherein combining the at least one group of symbol sequences and the phase data, and performing encoding, to obtain the output data, comprises:
  splitting the at least one group of symbol sequences into at least two categories of symbol sequences, wherein the at least two categories comprise a first category of symbol sequences and a second category of symbol sequences, amplitude values of the first category of symbol sequences are not zero (0), and amplitude values of the second category of symbol sequences are zero (0);
  combining the first category of symbol sequences and the phase data, to obtain phase and amplitude combined data; and
  combining the second category of symbol sequences and the phase and amplitude combined data, to obtain the output data.

14. The encoding device according to claim 13, further comprising:
  obtaining check data of the phase data and the at least one group of symbol sequences; and
  wherein combining the first category of symbol sequences and the phase data, to obtain the phase and amplitude combined data, comprises:
    combining the check data and the phase data, to obtain phase and check combined data; and
  combining the phase and check combined data and the first category of symbol sequences, to obtain the phase and amplitude combined data.

15. The encoding device according to claim 14, wherein the at least one group of symbol sequences are amplitude indexes of the constellation points that are in the constellation diagram and to which the amplitude data is mapped, there are K+1 categories of values of the amplitude indexes, and K is a positive integer; and wherein combining the phase and check combined data and the first category of symbol sequences, to obtain the phase and amplitude combined data, comprises:

classifying bits comprised in the first category of symbol sequences, to obtain K groups of amplitude bit sequences, wherein amplitude indexes of bits comprised in a same group of amplitude bit sequences have a same value;

splitting the phase and check combined data, to obtain K groups of phase bit sequences that are in a one-to-one correspondence with the K groups of amplitude bit sequences, wherein a length of each group of the K groups of phase bit sequences is associated with values of amplitude indexes of the corresponding group of amplitude bit sequences; and performing an operation on each group of the K groups of amplitude bit sequences and a corresponding group of phase bit sequences, to obtain K groups of bit sequences, wherein lengths of at least two groups of the K groups of bit sequences are different, and the combined data is the K groups of bit sequences.

16. The encoding device according to claim 15, wherein performing the operation on each of the K groups of amplitude bit sequences and the corresponding group of phase bit sequences comprises:

performing mapping on the K groups of phase bit sequences in a preset manner, to obtain K groups of phase-mapped bit sequences; and performing the operation on each group of the K groups of phase-mapped bit sequences and a corresponding group of amplitude bit sequences, to obtain the K groups of bit sequences.

17. The encoding device according to claim 11, wherein performing probabilistic constellation shaping encoding on the amplitude data based on the constellation diagram and the probability value corresponding to each constellation point comprises:

splitting the amplitude data into at least one group of segmented bit sequences based on a preset length; and performing probabilistic constellation shaping (PCS) encoding on each group of the at least one group of segmented bit sequences based on the constellation diagram, to obtain the at least one group of symbol sequences that is in a one-to-one correspondence with the at least one group of segmented bit sequences, wherein bits comprised in the at least one group of symbol sequences correspond to the occurrence probabilities of the constellation points.

18. A communication system, comprising:
an encoding device; and
a decoding device, wherein the encoding device is configured to:
split to-be-encoded data into phase data and amplitude data according to a preset rule;

obtain a constellation diagram corresponding to the to-be-encoded data, wherein the constellation diagram comprises a plurality of constellation points, the plurality of constellation points comprises a constellation point with an amplitude value of zero (0), each constellation point of the plurality of constellation points has a corresponding probability value, and each respective probability value indicates an occurrence probability of the corresponding constellation point;

perform probabilistic constellation shaping encoding on the amplitude data based on the constellation diagram and the probability value corresponding to each constellation point, to obtain at least one group of symbol sequences; and combine the at least one group of symbol sequences and the phase data, and performing encoding, to obtain output data; and wherein the decoding device is configured to:
obtain a received signal;
perform hard decision on the received signal, to obtain first amplitude data;
perform iterative decoding based on the received signal and the first amplitude data, to obtain second amplitude data and phase data;
perform probabilistic constellation shaping decoding on the second amplitude data based on the constellation diagram, to obtain amplitude-decoded data; and
combine the amplitude-decoded data and the phase data, to obtain decoded data.

19. The communication system according to claim 18, wherein the probability value corresponding to each constellation point in the constellation diagram is determined based on information entropy, a quantity of constellation points in the plurality of constellation points, and an encoding length of the probabilistic constellation shaping encoding, and wherein the information entropy depends on a capacity of the to-be-encoded data.

20. The communication system according to claim 18, wherein combining the at least one group of symbol sequences and the phase data, and performing encoding, to obtain the output data comprises:

splitting the at least one group of symbol sequences into at least two categories of symbol sequences, wherein the at least two categories comprise a first category of symbol sequences and a second category of symbol sequences, amplitude values of the first category of symbol sequences are not zero (0), and amplitude values of the second category of symbol sequences are zero (0);

combining the first category of symbol sequences and the phase data, to obtain phase and amplitude combined data; and combining the second category of symbol sequences and the combined data, to obtain the output data.

* * * * *